T. OAKES & D. RESSLAR.
GLASS DRAWING APPARATUS.
APPLICATION FILED DEC. 19, 1908.
1,042,956.
Patented Oct. 29, 1912.
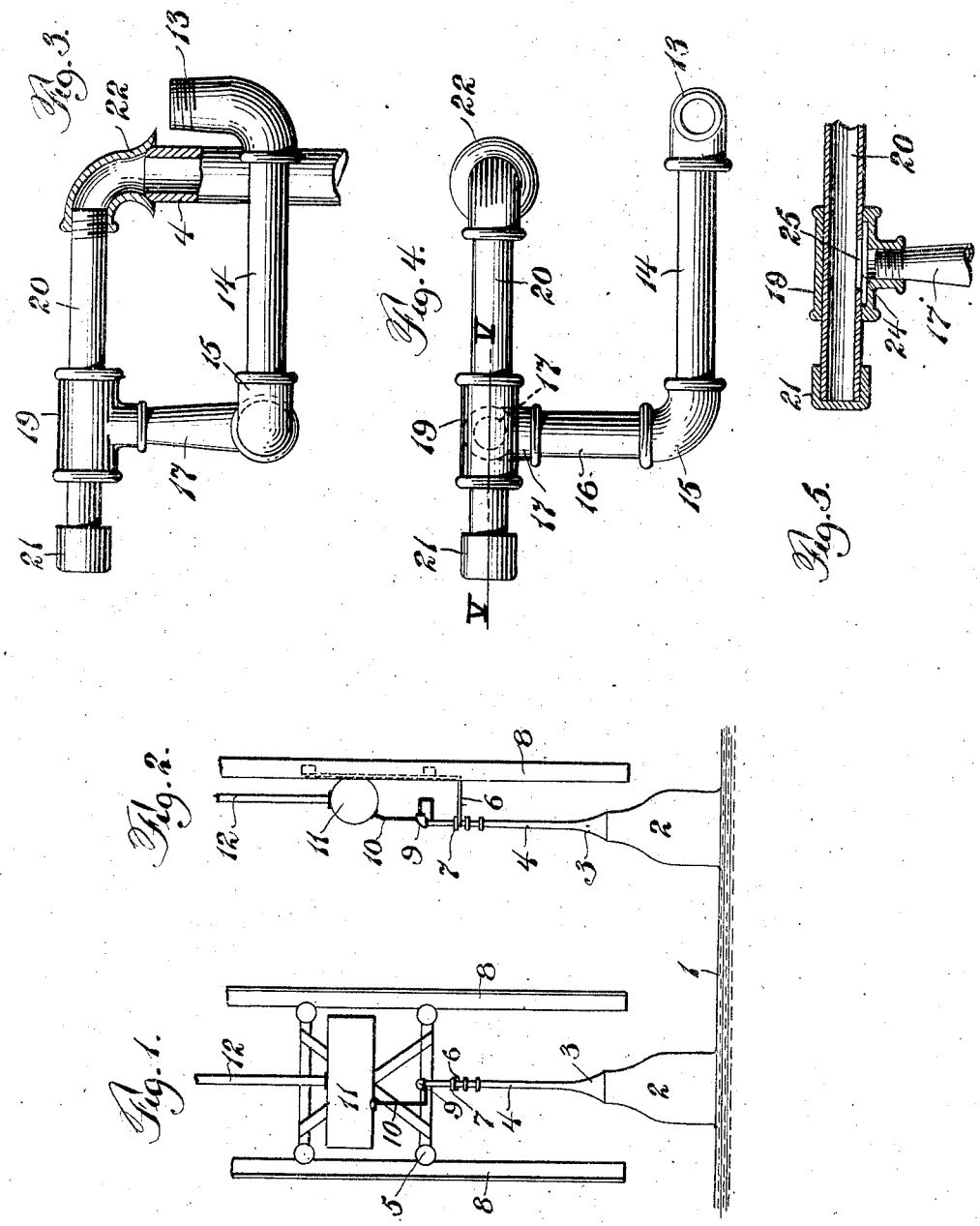
WITNESSES
INVENTORS

UNITED STATES PATENT OFFICE.

TRAVIS OAKES AND DANIEL RESSLAR, OF MOUNT VERNON, OHIO, ASSIGNORS TO PITTSBURGH PLATE GLASS COMPANY, OF PITTSBURGH, PENNSYLVANIA, A CORPORATION OF PENNSYLVANIA.

GLASS-DRAWING APPARATUS.

1,042,956.            Specification of Letters Patent.        Patented Oct. 29, 1912.

Application filed December 19, 1908. Serial No. 468,314.

*To all whom it may concern:*

Be it known that we, TRAVIS OAKES and DANIEL RESSLAR, citizens of the United States, both residing at Mount Vernon, in the county of Knox and State of Ohio, have invented certain new and useful Improvements in Glass - Drawing Apparatus, of which the following is a specification.

The invention relates to glass drawing apparatus and particularly to the connecting means through which air is supplied to the hollow bait commonly employed in the drawing of glass cylinders. The invention has for its primary objects; the provision of an improved connection from which the handle of the bait may be readily and automatically disengaged by the lateral movement of the bait; and the provision of a simple connecting arrangement wherein the use of independent lifting and lowering means for moving the air connection to secure disengagement from the bait is dispensed with. One embodiment of the invention is illustrated in the accompanying drawings, wherein:—

Figure 1 is a diagrammatic front view of the drawing apparatus with our improvement applied thereto, Figure 2 is a side elevation of the apparatus as shown in Figure 1, Figure 3 is an enlarged detail side elevation partly in section of the connecting device wherein our invention particularly resides, Figure 4 is a plan view of the device as illustrated in Figure 3, and Figure 5 is a section on the line V—V of Figure 4.

Referring first to the general arrangement as illustrated in Figures 1 and 2; 1 is the body of glass from which the drawing takes place; 2 is a cylinder in process of drawing; 3 is the bait provided with the hollow handle 4 by means of which air under pressure is supplied to the cylinder during drawing; 5 is the carriage to which the bait is detachably secured by means of the projecting fork 6 passing beneath a collar 7 upon the handle of the bait; 8, 8 are the guides upon which the carriage moves; 9 is the connection whereby air is supplied to the hollow handle; 10 is the pipe leading to the said connection; 11 is a cylinder to which the pipe 10 is connected; and 12 is the pipe for supplying air to the cylinder 11.

Referring now to Figs. 3, 4 and 5 wherein the connection is illustrated in detail, 13 is the elbow to which the pipe 10 is connected; 14, 15, 16, and 17 are connecting members whereby the elbow 13 is connected to a T 19, and 20 a pipe slidably mounted in the T 19. This pipe 20 is provided at its end with a cap 21 and carries at its other end the elbow 22 having a flared opening at its lower end for receiving the rounded or beveled upper end of the bait 4 as indicated in Figure 3. The pipe 20 communicates with the T 19 by means of the hole 24 and slot 25 (Figure 5). The screw connection between the pipe 16 and elbow 15 is sufficiently loose to permit of their relative rotative movement, as is also the connection between the pipe 17 and T 19, so that the pipe 20 carried by the T 19 may oscillate vertically with the pipe 16 as an axis, or laterally with the pipe 17 as an axis and may be slid longitudinally, thus adapting the connection to fit any position of the handle 4.

When it is desired to disconnect the hollow handle 4 from the elbow 22, all that is necessary is to move the handle laterally. The elbow 22 is readily cammed upward by the rounded end of the handle, which upward movement is possible by reason of the rotative connection between the pipe 16 and elbow 15. The contact between the elbow 22 and the upper end of the handle 4 is ordinarily sufficiently tight for all practical purposes as the air pressure employed in the apparatus is low. The operation is a convenient and advantageous one for the reason that in the ordinary handling of the cylinders after drawing, it is necessary to move the apparatus laterally away from the drawing mechanism, so that the normal manipulation of the apparatus is all that is necessary in order to free the handle of the bait from its connection with the air supply device. The construction is also advantageous in that it permits the mounting of the connection directly upon the drawing carriage, and no movement of the connection bodily with respect to the drawing carriage is necessary in order to free the connection from the handle. It is therefore unnecessary to provide means for raising the apparatus for supplying the air independently of the drawing carriage as has heretofore been the case. Other advantages incident to the construction will be apparent to those skilled in the art.

Having thus described our invention and illustrated its use, what we claim as new and desire to secure by Letters Patent is the following:—

1. In glass drawing apparatus, the combination with a bait having a hollow handle, of a member for supplying air to the handle mounted for vertical and lateral oscillation and provided with an end having a cam engagement with the end of the hollow handle so arranged that the movement of the handle laterally without tilting secures release of the said end from the said member.

2. In glass drawing apparatus, the combination with a bait having a hollow handle, of a member for supplying air to the handle mounted for lateral and vertical oscillation and having an outlet adapted to make detachable cam engagement with the end of the hollow handle, whereby a lateral movement of the handle automatically disengages it from the said member.

3. In glass drawing apparatus, the combination with the bait having a hollow handle, of an air connecting means comprising a support mounted for universal movement, and a pipe slidably mounted in the support and provided with an outlet adapted to make detachable engagement with the end of the hollow handle.

4. In glass drawing apparatus, the combination with the bait having a hollow handle, with its end beveled, of a laterally extending pipe for supplying air to the handle pivoted at one end for vertical oscillation and having a downwardly opening outlet portion at its other end formed to fit the beveled end of the handle, whereby the handle and connection may be automatically disengaged by a relative lateral movement while the handle is maintained in a vertical position.

5. In glass drawing apparatus, the combination with the bait having a hollow handle, with its end rounded, of a laterally extending pipe for supplying air to the handle mounted for universal movement and having an outlet portion formed to fit the rounded end of the handle, whereby the handle and connection may be automatically disengaged by a relative lateral movement while the handle is maintained in a vertical position.

6. In combination in a glass drawing apparatus, a bait having a hollow handle, a carriage for lifting the bait, and means whereby air may be supplied to the handle comprising, a support, a laterally extending pipe thereon having one end turned down and fitting over the end of the handle of the bait, and pivoted on the support for vertical movement at a point removed from the said down-turned end.

7. In combination in a glass drawing apparatus, a bait having a hollow handle, a carriage for lifting the bait and means whereby air may be supplied to the handle comprising a support, a laterally extending pipe slidable thereon and having one end turned down and fitting over the end of the handle of the bait, and pivoted on the support for vertical movement at a point removed from the said down-turned end.

8. In combination in a glass drawing apparatus, a bait having a hollow handle, a carriage for lifting the bait, and means whereby air may be supplied to the handle comprising, a support, a laterally extending pipe thereon having one end turned down and fitting over the end of the handle of the bait, and supported for universal oscillatory movement on the support at a point removed from the said down-turned end.

In testimony whereof we have hereunto signed our names in the presence of the two subscribed witnesses.

TRAVIS OAKES.
DANIEL RESSLAR.

Witnesses:
THOS. E. LAUGHEN,
BANNER M. ALLEN.